(12) United States Patent
Hill

(10) Patent No.: US 6,960,862 B2
(45) Date of Patent: *Nov. 1, 2005

(54) ELECTRIC MACHINE WITH SOFT MAGNETIC TEETH

(76) Inventor: Wolfgang Hill, Ortenbergstr. 3, Karlsruhe (DE), 76135

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 145 days.

(21) Appl. No.: 09/477,608

(22) Filed: Jan. 4, 2000

(65) Prior Publication Data

US 2002/0175586 A1 Nov. 28, 2002

Related U.S. Application Data

(63) Continuation of application No. PCT/DE98/01826, filed on Jul. 2, 1998, now abandoned.

(30) Foreign Application Priority Data

Jul. 2, 1997 (DE) .......................... 197 28 172

(51) Int. Cl.⁷ ............................................... H02K 1/06
(52) U.S. Cl. ....................................... 310/217; 310/254
(58) Field of Search .............................. 310/218, 215, 310/217, 270, 168, 254, 152, 154, 156, 179, 214; H02K 19/10, 1/14, 37/00

(56) References Cited

U.S. PATENT DOCUMENTS

| | | | |
|---|---|---|---|
| 2,236,291 A | * 3/1941 | Kilbourne | 310/218 |
| 2,655,613 A | * 10/1953 | Wieseman | 310/218 |
| 4,036,638 A | * 7/1977 | Ray et al. | 148/304 |
| 4,392,072 A | * 7/1983 | Rosenberry | 310/254 |
| 4,403,401 A | * 9/1983 | Rosenberry | 310/216 |
| 4,698,537 A | * 10/1987 | Byrne et al. | 310/254 |
| 5,523,635 A | * 6/1996 | Ferreira et al. | 310/54 |
| 5,818,138 A | * 10/1998 | Hill | 310/152 |
| 5,909,072 A | * 6/1999 | Muller | 310/254 |

FOREIGN PATENT DOCUMENTS

| | | | | |
|---|---|---|---|---|
| DE | 2653387 A1 | * | 6/1978 | ......... H02K/37/00 |
| EP | 606974 A | * | 5/1994 | ............ H02K/1/12 |
| EP | 0606974 | * | 7/1994 | ......... H02K/44/06 |

* cited by examiner

Primary Examiner—Darren Schuberg
Assistant Examiner—Karen Addison

(57) ABSTRACT

Electric machines operating according to the reluctance principle have toothed air gap surfaces between their moving and fixed parts. The magnetizability of these teeth directly affects the performance of the machine. According to the invention, the teeth projecting into the air gap consist of a material which in relation to the remaining soft-magnetic body presents better magnetizability and/or greater magnetic saturation flux density. This material is preferably a grain-oriented electric steel sheet or a cobalt/iron alloy. Alternatively or in addition thereto, the soft-magnetic body in which the conductor coils are positioned can be made entirely of a grain-oriented material by appropriate segmentation. In this case, every other pole is non-spooled and consists of two halves separated by a non-magnetic holding element. The use of steel sheets rolled at an angle also contributes to the improved utilization of space and material in rotating machines, especially in transverse flux machines. The characteristics of the construction provided for in the invention result in the production of little cutting waste and thus raise the performance of electric machines with soft-magnetic teeth at the air gap surface and reduce losses.

7 Claims, 1 Drawing Sheet

ELECTRIC MACHINE WITH SOFT MAGNETIC TEETH

This is a continuation of International Application PCT/DE98/01826, with an international filing date of Jul. 2, 1998, and with priority of the German application 197 28 172.9, filed on Jul. 2, 1997, now abandoned.

BACKGROUND OF THE INVENTION

1. Field of the Invention

The invention concerns an electric machine with soft magnetic teeth at the air gap surface and a production process for such a machine.

2. Description of Prior Art

Electric machines with soft magnetic teeth at the air gap surface are known in a diversity of designs under the name of "step motor" or "switched reluctance machine". The toothing causes the magnetic resistance of the magnetic flux, which flows through the air gap, to change as the rotor is moving. The utilizable forces depend on the tooth geometry, the magnetizability of the soft magnetic material, and the flux density in the air gap.

One design which is distinguished by its simple winding technique is the transversal flux machine. The soft magnetic body has gaps in circumferential direction that correspond to approximately one half of the pole width. The current flowing in the conductor ring can generate only a weak magnetic field in said gaps so that these circumferential sections contribute more to power loss than to useful performance.

From DE 43 25 740 C1, a transversal flux machine is known in which U-shaped soft magnetic cores are arranged around the conductor ring, the tangential width of said soft magnetic cores increasing disproportionately as the radius of the conductor ring increases. This results in gaps in circumferential direction between the radially inner ends of the cores which are wider than the width of the cores themselves.

In DE-OS 28 05 333 and DE 40 40 116 C2, segmented soft magnetic bodies are described in which the layering of the tooth cores is effected perpendicular to the layering of the yoke sheets.

From DE 34 14 312 A1, a permanent magnet excited machine with groups of electromagnets is known where the electromagnets have non-wound half-poles on both ends in direction of movement. The phase offset is generated by a gap between the electric pole units. The poles and half-poles have pole shoes which, with a plane air gap surface, provide only tight groove slots for inserting the wire winding. The ferromagnetic circuit of the electromagnet groups is made as a unit.

Furthermore, from DE 42 41 085 A1 is known the attachment of pole shoes to pole cores by means of dovetailing.

The objective of the present invention is, therefore, to advance a machine that is functioning in accordance with the reluctance principle in such a manner that, at reasonable production costs, the torque-to-bore volume ratio in relation to the air gap surface is increased and the ohmic and magnetic losses are decreased.

SUMMARY OF THE INVENTION

According to the invention, this objective is achieved in accordance with the characteristics of claims 1 and 6.

According to the invention, the soft magnetic teeth which define the air gap surface consist of a material that, compared to the remaining soft magnetic body, provides a higher flux density at the same magnetic field strength and/or a higher magnetic saturation flux density. Preferably, grain oriented electric sheet or a cobalt-iron alloy is used for the teeth.

In order not to impair the power increasing effect, the total cross section of the remaining soft magnetic body in direction of the magnetic flux is larger than the sum of the tooth surfaces that border on the air gap.

Example: By utilizing a cobalt-iron alloy, the flux density in the teeth at equal current supply to the machine can be increased by up to 20% (2.3 T versus 1.9 T). With the air gap surface being equal or, respectively, in a machine of approximately equal size, the capacity of the machine increases by 44%.

Alternatively or complementary, the soft magnetic body in which the conductor coils are arranged consists of prefabricated pole segments which are made preferably of grain oriented electric sheet. Every other pole is non-wound and consists of two pole halves which are connected by a nonmagnetic holding element. The number of teeth at the air gap surface of the spooled pole corresponds to twice the number of the teeth of a half-pole. The preferably T-shaped holding element consists of a material with low magnetic and electric conductivity and prevents the movement of the half-poles in direction of the magnetic flux in the air gap. The half-poles, on the other hand, fix the spooled pole element in its position.

This modular construction corresponds to the second basic idea of the invention and permits also the advantageous use of grain oriented material, thereby optimally utilizing the good magnetizability in the air gap area and the machine area where the space must be shared by the conductor material and the ferromagnetic material. The increase of magnetic resistance which impairs the capacity of the machine occurs in the grain oriented pole segments at only approximately 1.9 T. On the other hand, the increase of magnetic resistance in not grain oriented electric sheet occurs already at 1.6 T. Only the novel segmentation—in comparison to the state of the art—of the wound body allows optimal utilization of the grain orientation in the groove area of the poles.

The higher flux density in the pole allows at a like air gap diameter and a like magnetic flux an enlargement of the groove width, and the additional groove space makes a decrease in winding losses possible. Additionally, the pole winding does not need to be threaded through a tight groove slot.

Example: Compared to a conventional machine where the pole core width equals the groove width in the middle of the groove area, the pole core width, at equal flux density in the air gap, can be increased by 15% by fabricating the pole segments from grain oriented electric sheet. Additionally, thanks to the more advantageous winding technique, the pole coil can be made with a 65% instead of a 50% space factor. In total, a 50% larger copper cross section surface per groove or, respectively, a decrease of winding losses of 33% is achieved.

Essential for this improvement is the segmentation of the wound soft magnetic body into spooled poles and non-spooled half-poles where the half-pole constitutes at least one tooth at the air gap surface. The spooled pole and the two half-poles connected to the same in the yoke area are a magnetic unit that is separated from adjacent identical magnetic units by non-magnetic holding elements. The teeth of the half-poles separated by the holding element are more distant from each other in direction of the movement than the teeth within the magnetic unit and thereby generate a phase offset between adjacent magnetic units.

The non-magnetic holding elements avoid counteracting forces from undesirable leakage flux and thereby also increase the force density of the machine. The negative influence of the secondary air gap is largely avoided by pressing the pole segments together and by a distinct increase of the contact surface by means of a beveled cut. In addition, an increase of the magnetic resistance in the yoke area is avoided by keeping the thickness of the yoke in direction of the groove depth at 75% of the width of the spooled pole. The combination of the effects more advantageous magnetization due to grain oriented pole segments, compact winding technique of the pole coils, short flux paths and decoupling of the phases due to magnetically separated units, results in a distinct increase of the power density.

Besides improved capacity and lower winding losses, the segmentation according to the invention reduces the complexity of the punching tools and the punching waste. Winding of the pole coils is simplified and the additional assembly expense due to the large number of prefabricated pole parts is justifiable when utilizing flexible automated assembly machinery. The segmentation of the double limb pole machine according to the invention is suitable for rotating designs with radial and axial air gap field as well as for linear drives.

Better space and material utilization in rotating machines, particularly in those with transversal flux arrangement, is also achieved by the use of electric sheet with a differential thickness from end to end. Presently, electric sheet of constant thickness is used exclusively in the electrical engineering industry. In accordance with the third basic idea of the invention, the sheets are shaped in direction of their thickness prior, during or after punching. This is done preferably in a rolling step prior to punching, and the result is an electric strip with a trapezoidal cross section.

The trapezoidal strip can be used advantageously in transversal flux machines by arranging one complete layered iron ring from two different punched sheets around the conductor rings. The flux is concentrated in the teeth, which preferably consist of a cobalt-iron alloy, in the vicinity of the magnetically active air gap only. The use of electric laminations of trapezoidal cross section is also advantageous in radial and axial flux machines, particularly in intermediate stators or rotors.

BRIEF DESCRIPTION OF THE DRAWINGS

The drawings display advantageous embodiments of the invention.

DETAILED DESCRIPTION OF THE PREFERRED EMBODIMENT

Figure 1:
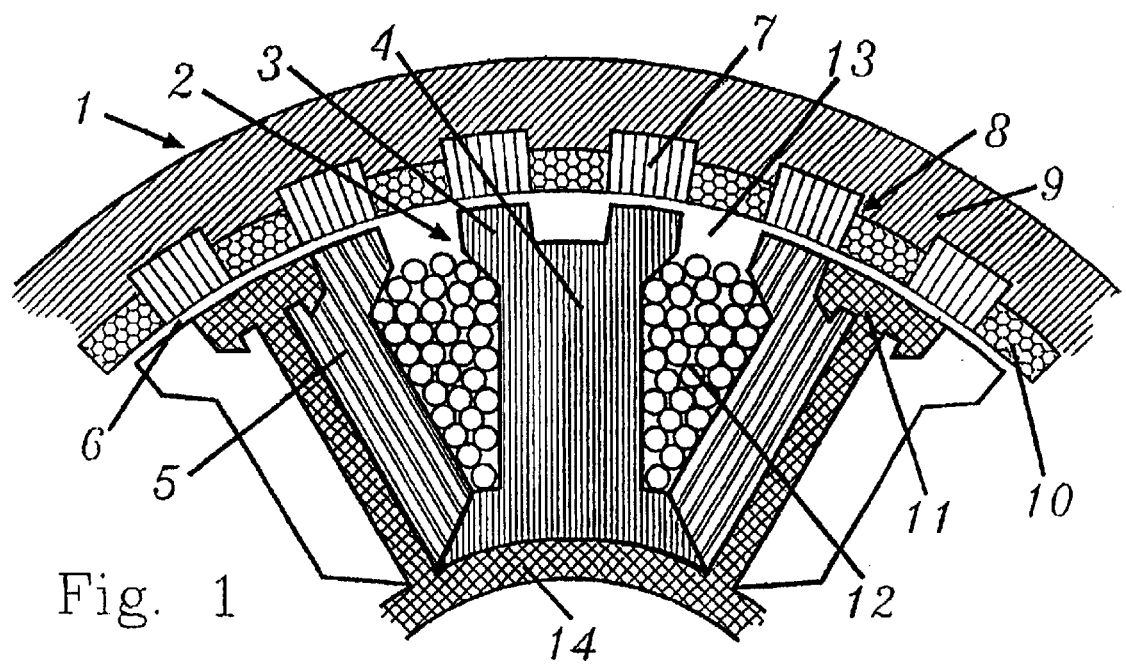
FIG. 1 shows a circumferential cutout from a cross section of a step motor with external rotor with pole shoe caps and a built up rotor ring.

FIG. 1 shows a cutout from the cross section of a reluctance machine according to invention (1) which consists of six identical magnetic units (2) with four teeth (3) each. In the cutout, only one magnetic unit is shown which consists of a spooled pole segment (4) and two identical non-spooled half pole segments (5). Pole and half pole segments consist of axially stacked grain oriented electric sheet with the preferred direction in radial direction. The half poles have one tooth at the surface of the air gap (6). 24 stator teeth (3) are arranged opposite 26 tooth segments (7) of the rotor (8). The distance between the teeth (3) of adjacent half poles (5) is larger by $\frac{2}{3}$ of the tooth width compared to the distance of the teeth within a magnetic unit. The number of teeth per magnetic unit may be 4, 8, 12, 16 etc. (respectively 4×k with k being an integer), and the number of magnetic units may be any multiple of the number of phases.

So that the rotor teeth (7) do not generate increased magnetic resistance prior to the stator teeth (3), they are made of grain oriented electric sheet as well. On the other hand, the rotor ring (9) consists of electric sheet that is not grain oriented. The tangentially bundled laminations of the rotor teeth (7) have a slightly trapezoidal cross section. This cross section is achieved by using trapezoidal rolled electric strips. The strips are bundled into bars and pressed into a heated rotor ring. During cooling, the pressure of the rotor ring (9) onto the rotor teeth (7) increases, so that firm seating is guaranteed. In addition, the tangential space between the rotor teeth is filled with a mechanically stable insulation material (10) that contributes further to the stability.

In the stator, the space between adjacent teeth (3) of different magnetic units is occupied by the broad end of the T-shaped holding element (11). The holding elements consist also of a non-magnetic material with low electric conductivity and high mechanical strength.

The pole coil (12) is spooled onto the pole segment (4) in a previous production step. In this step, a considerably higher space factor can be achieved by exact placement of the wire under tensile stress than by inserting the winding through the groove slot (13). Subsequently, the two adjacent half poles (5) are pressed on tangentially and preferably attached by gluing. The completely assembled magnetic unit (2) is now axially inserted into the preheated holding body (14). During cooling, the T-shaped holding elements (11) contract and thereby generate a prestress which stabilizes the three-piece soft magnetic body of the magnetic unit even at the high fluctuations of the magnetic normal force in the air gap. Additionally, the construction is being sealed after assembly. Complementary, a claw-shaped body (not shown) can engage in the grooves of the pole segments and thereby contribute to stabilization.

Figure 2:
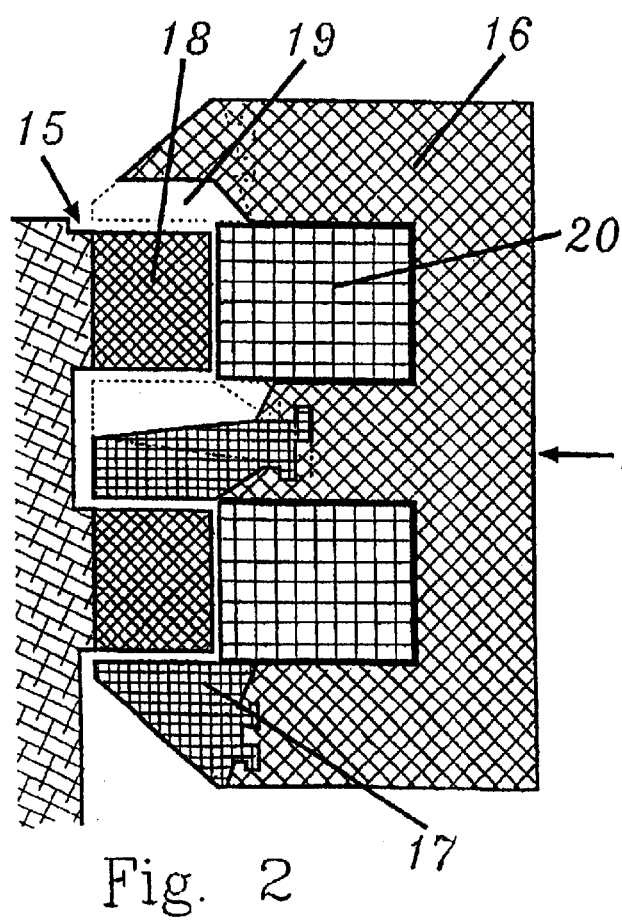
FIG. 2 shows one half of a cross section of a transversal flux machine with tooth inserts of a cobalt-iron alloy.

In FIG. 2, a cut through one half of the cross cut of a two-phase transversal flux machine (15) is depicted. Smaller tooth inserts (17) of a cobalt-iron alloy are inserted into punched sheet (16) of not grain oriented electric sheet. In direction of movement, the rotor segments (18) which also consist of a cobalt-iron alloy, are always only faced by the tooth inserts (17) or recesses (19). On the other hand, punched sheet (16) encloses the conductor ring (20) over the entire circumference and the flux density, even at the maximal flux density (2.3 T) in the tooth inserts (17), is limited in the remaining soft magnetic body (21) to the favorable values with regard to stray power between 1.2 and 1.4 T. Because the conductor ring (20) is in tangential direction completely embedded on three sides by the soft magnetic body (21), electric current can contribute evenly to the generation of a magnetic field over the entire length of the conductor. Only in critical contractions of the magnetic flux significantly more expensive highly permeable material is being used.

The proportion of the rotor segments and tooth inserts in terms of the weight of the soft magnetic body can be reduced to 10–20% by the design according to invention. The result is considerable savings of material costs at approximately equal capacity in comparison to a conventional machine that consists in its entirety of a cobalt-iron alloy.

Figure 3:
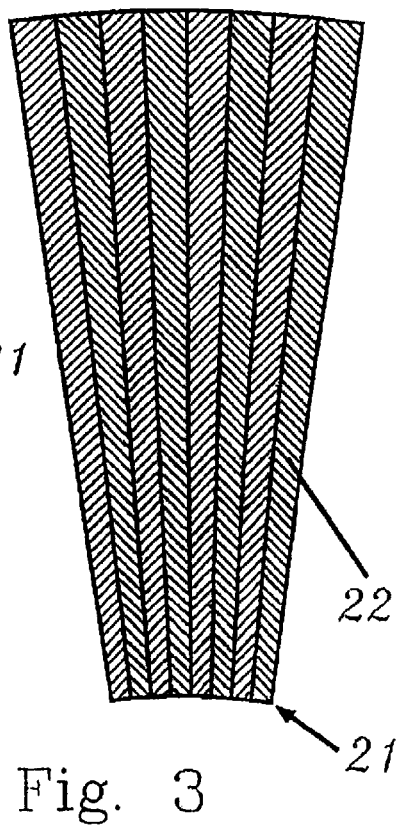
FIG. 3 shows a cutout from the axial lateral view of the soft magnetic body of the transversal flux machine of FIG. 2.

The improvement in the transformation of electric energy into magnetic energy is achieved by the use of electric sheet of variable thickness. In FIG. 3, it can be recognized how a gapless soft magnetic ring (21) can be produced by tangential stacking of electric sheet (22) with trapezoidal cross section.

Electric sheet with a trapezoidal cross section—as shown by the rotor teeth in FIG. 1—can also be advantageously inserted into radial flux machines. Furthermore, electric sheet deformed in such a manner can be inserted into segmented axial flux machines for better utilization of space and, consequently, improvement of capacity.

In the space between the soft magnetic teeth, permanent magnets that function as magnetic barriers may also be inserted. The present invention is not limited to pure reluctance machines but also includes hybrid motors and hybrid generators which, in addition to the soft magnetic teeth at the air gap are equipped with short circuit windings or exciting windings.

What is claimed is:

1. Electric machine with at least one magnetic circuit and at least two structural groups that are moveable against each other, said two structural groups being separated from each other by an air gap, and said two structural groups containing at least one soft magnetic body each, partial areas of the surfaces of said at least two structural groups that lie adjacent to said air gap having inhomogeneous properties with regard to the magnetic flux, wherein at least one said soft magnetic body has a region that is facing the air gap, said region facing the air gap having soft magnetic teeth that are disposed toward said air gap consisting of crystalline material with higher magnetizability and/or higher saturation flux density than the remaining region of said soft magnetic body that is disposed more distant from said air gap, said remaining region of said soft magnetic body belonging to the same said magnetic circuit, and said remaining region of said soft magnetic body possessing in total a larger cross section in direction of the flux than the sum of said teeth that are disposed toward said air gap and that conduct the same magnetic flux in one direction of said magnetic circuit.

2. Electric machine in accordance with claim 1, wherein at least one said so magnetic body has teeth at said air gap, said teeth consisting of grain oriented electric sheet, and at least one other said part of said soft magnetic body, said part consisting of electric sheet that is not grain oriented.

3. Electric machine in accordance with claim 1, wherein at least one said so magnetic body has teeth at said air gap, said teeth being made of a cobalt-iron alloy, and at least one other said part of said soft magnetic body, said part being made of another iron alloy.

4. Electric machine in accordance with claim 1, wherein at least one said so magnetic body consists of electric sheet of variable sheet thickness.

5. Electric machine in accordance with claim 1, wherein in a rotating machine said soft magnetic body is stacked in tangential direction and the thickness of said sheet increases as the radius increases.

6. Electric machine with at least one magnetic circuit and at least two structural groups that are moveable against each other, said two structural groups being separated from each other by an air gap, and said two structural groups containing at least one soft magnetic body each, partial areas of the surfaces of said at least two structural groups that lie adjacent to said air gap having inhomogeneous properties with regard to the magnetic flux, wherein at least one of said structural groups contains at least two magnetic units said magnetic units consisting of at least one spooled pole segment and two non-spooled half pole segments, said pole segments and said halt pole segments being composed of grain oriented electric sheet, said to half pole segments abutting at least one said pole segment in the yoke area.

7. Electric machine with at least one magnetic circuit and at least two structural groups that are moveable against each other, said two structural groups being separated from each other by an air gap, and said two structural groups containing at least one soft magnetic body each, partial areas of the surfaces of said at least two structural groups that lie adjacent to said air gap having inhomogeneous properties with regard to the magnetic flux, wherein at least one of said two structural groups contains at least two adjacent non-spooled half pole segments and a T-shaped holding element that is arranged between said adjacent half pole segments, said holding element magnetically separating said half pole segments and preventing movement of said half pole segments.

* * * * *